United States Patent [19]

Stern

[11] Patent Number: 5,134,395

[45] Date of Patent: Jul. 28, 1992

[54] JOYSTICK/SWITCH INTERFACE TO COMPUTER SERIAL PORT

[75] Inventor: David R. Stern, Hinsdale, Ill.

[73] Assignee: Ambrosia Microcomputer Products, Inc., Hinsdale, Ill.

[21] Appl. No.: 565,685

[22] Filed: Aug. 10, 1990

[51] Int. Cl.$^5$ .............................. H03K 17/94
[52] U.S. Cl. ................... 341/20; 340/706; 340/709
[58] Field of Search .............. 341/20, 22, 26; 364/188–190; 340/709, 711, 706; 273/148 B

[56] References Cited

U.S. PATENT DOCUMENTS

| 4,516,939 | 5/1985 | Crimmins, Jr. | 341/22 X |
| 4,712,100 | 12/1987 | Tsunekuni et al. | 340/709 x |
| 4,868,780 | 9/1989 | Stern | 340/709 X |

FOREIGN PATENT DOCUMENTS 2143660  2/1985  United Kingdom ................ 364/190

OTHER PUBLICATIONS

Maruyama et al; Keyboard/Mouse Adapter; IBM Technical Disclosure Bulletin; vol. 27, No. 5, Oct. 1984, pp. 3042–3043.

Primary Examiner—Donald J. Yusko
Assistant Examiner—Michael Horabik
Attorney, Agent, or Firm—Robert J. Black

[57] ABSTRACT

An interface circuit for use between a control point equipped with joysticks and switches and a standard serial input port of a personal type computer. The interface circuitry includes an analog to digital converter, a microcontroller operated as a reformatter for signals received from the analog to digital converter and a transistorized converter circuit connected between the output of the microcontroller and the serial input of the computer to convert the voltage level of signals output from the microcontroller in reformatted form.

10 Claims, 1 Drawing Sheet

JOYSTICK/SWITCH INTERFACE TO COMPUTER SERIAL PORT

BACKGROUND OF THE INVENTION

1. Field of the Invention

The present invention pertains to remote control of computers and more particularly to an interface between joystick and switch input devices as utilized in remote control environments and to a serial port of a personal computer.

2. Background Art

In computer systems, many methods of receiving information from the utilizer or user are employed, such as the use of serial input/output ports, parallel input/output ports, keyboards, bus expansion slots, cartridge slots, mouse ports, and joystick ports.

It is also possible by means of appropriate interface circuitry to utilize analog joysticks (these typically have four analog inputs and four switches to input into a standard RS232 serial computer port. This is a standard Electronics Industry Association serial port for use with computers). An arrangement for utilizing the ROM cartridge slot of a computer is taught by my U.S. Pat. No. 4,868,780 which issued on Sep. 19, 1989 and is assigned to the same assignee as the present application.

In the present application it is desirable for the interface to be powered by the port which it is accessing, eliminating the need for extra cables or power supplies. Such an arrangement permits the present invention to be utilized on a variety of computers. Examples of computers with which this kind of arrangement may be operated include the PC brand 286/12, the Atari 520ST, and Commodore Amiga 500. In addition, it should be noted that almost any IBM compatible personal computer usually includes a serial port built in like those described in the previous models. It is also relatively simple to add such an arrangement to computers not so equipped by means of a Jamico RS232 serial input card specifically designed for use with IBM PC/XT/AT/386 and compatible computers.

If a computer program requires the ability to receive analog inputs, a circuit is typically required to convert such inputs into a digital value and present that value to the computer, through use of one of its various methods of input. The switch positions may be converted to a logic level and then presented to the computer again through one of the above methods of input.

Some computers may not have provision for a joystick input. On the other hand, some computers do have joystick ports that allow only the input of a switch or digital data, such as up/down, right/left. Thus, while some computers have analog joystick inputs, a lack of standards requires the design of different joysticks for each computer. Accordingly, it is the purpose of the present invention to provide circuitry that can be utilized to input joysticks and switch positions into electronic industry standard RS232C ports, and therefore to be used with a variety of different computer types.

SUMMARY OF THE INVENTION

The present invention provides joystick and switch interface to a computer, with the circuit plugged into the serial port of the computer and powered by otherwise unused signal leads from the serial port of the computer. The circuitry includes an analog to digital converter, a microcontroller and a unique interface circuit.

The principal problem in the suggested environment is to utilize or sense joystick and switch positions and to then output them in a standard serial format to the personal computer.

In the present invention, an ADCO834 analog to digital converter, manufactured by National Semiconductor, is utilized. This device is an 8 bit analog to digital converter with a 4 channel analog multiplex on the input and a microwire serial interface. The "microwire" serial interface is incorporated in some National Semiconductor integrated circuits for communication between integrated circuits with a minimum of wiring connections.

A COP413C microcontroller, also manufactured by National Semiconductor, is utilized to control the operation of the present invention. The microcontroller also includes a microwire serial interface that is compatible with the serial interface in the ADCO834 analog to digital converter. The program in the COP413C microcontroller goes through the following predefined sequence:

1) commanding the ADCO834 to select an input channel
2) converting it to a digital number and storing that value
3) repeat steps 1 and 2 for the other 3 channels
4) read in the switch positions through its L input port and store them
5) format the above stored data into a serial bit stream
6) toggle the GO output with a serial bit stream with a predefined standard serial format of analog joystick values and switch positions along with synchronization and security bits.

Finally, the GO output is connected to the RD or receiver input of a standard RS232C serial computer port through a unique transistor interface circuit that converts the logic levels (ground and positive 5 volts) to a bipolar output.

It should be noted that the foregoing programming or software for the microcontroller does not form a part of the present invention, it only being required that it perform the necessary functions outlined and described hereinafter.

DESCRIPTION OF THE DRAWING

The present invention is described in detail below with reference to the accompanying drawing wherein.

DESCRIPTION OF THE PREFERRED EMBODIMENT

Figure 1:
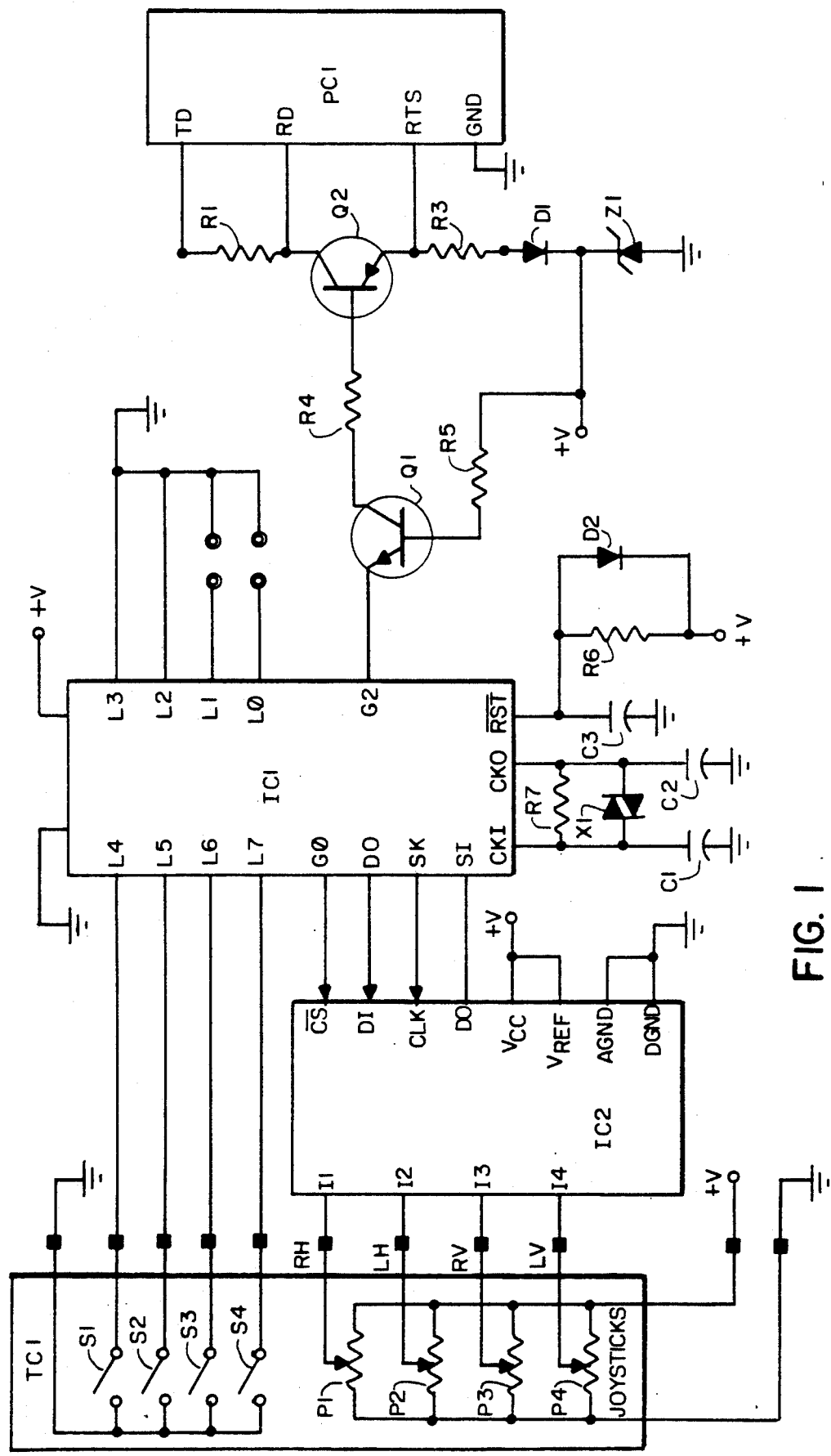
FIG. 1 is a combined block and schematic diagram of an interface circuit for utilization between joystick and switch units in a standard serial computer input.

The basic function of the circuitry of the present invention as shown in FIG. 1 is to interface four analog signals and four digital signals shown as S1, S2, S3, and S4 to a computer PC1 to its serial port input via leads designated TD, RD, and RTS.

Four potentiometers, designated P1, P2, P3, and P4 shown in control unit TC1 are incorporated into two joystick assemblies, each having one input grounded, with the other terminal attached to a positive 5 volt source. The wiper of each potentiometer (in each instance) is connected to each of the four analog inputs I1, I2, I3, and I4 of analog to digital converter IC2.

As the joysticks are moved, the potentiometers move and a voltage somewhere between 0 and positive 5 volts is applied to each of the analog inputs of the analog to digital converter IC2, namely, inputs I1, I2, I3, and I4. These voltages are then corresponded to the relative position of each of the joysticks. Since analog to digital converter IC2 has $V_{cc}$ connected to $V_{ref}$, the analog to digital converter IC2 will convert a ground input to a value of 0 and a positive 5 volt input to a value of 255. Intermediate voltages then will be converted to intermediate values. This conversion and the resulting amount determinant is integral to the analog to digital converter and is inherent in the unit suggested for this purpose.

The four single pole single throw switches (S1-S4, inclusive) are wired between ground and four of the IC2 "L" inputs (L4, L5, L6, and L7). Two of the L inputs (L2 and L3) are grounded or unused and two (L0 and L1) are open. Provision is made for the two open L inputs to be connected to ground by means of straps. Since the "L" input ports can be read into the microcontroller under its software control, the state or position of the switches S1-S4, inclusive, is available to the microcontroller software. Thus the state of the straps L0 and L1 is also available to the microcontroller. Strap inputs are used in the present invention to tell the microcontroller software what baud rate to output. The four signals required for a microwire serial interface between IC1 and IC2 are connected as follows:

GO out of IC1 to −CS (−chip select) in to IC2
DO (data out) from IC1 to D1 (data in) into IC2
SK (clock out) from IC1 to CLK in to IC2
SI (serial in) to IC1 from DO (data out) from IC2

The above connections are recommended by the manufacturer of integrated circuits IC1 and IC2 to implement their microwire interface. This arrangement then permits the microcontroller IC1 software to transmit instructions to the analog to digital converter IC2 and also allows the microcontroller IC1 software to receive data from the analog to digital converter IC2.

The clock inputs of IC1 (CKI and CIO) are wired to ceramic resonator X1, resistor R7, capacitors C1 and C2 as recommended by the manufacturer of the COP413C microcontroller or IC1. The negative reset input of IC1 is then wired to the power up reset circuits of capacitor C3, resistor R6, and diode D2 as recommended also by the manufacturer.

In the present arrangement, IC1 microcontroller's output G2 (the general purpose output) is wired to the emitter of NPN transistor Q1. The base of transistor Q1 is connected to a positive 5 volt source through resistor R5. The collector of transistor Q1 is connected to the base of PNP transistor Q2 through resistor R4. The collector of transistor Q2 is connected to the computer serial port signal RD and to resistor R1. Resistor R1 then is connected to the computer serial port signal input TD. The emitter of transistor Q2 is connected to resistor R3 with the resistor R3 then being connected to the anode of diode D1. The cathode of diode D1 in turn is connected to the cathode of zener diode Z1. The anode of zener diode Z1 is connected to ground.

Bipolar signals from the standard RS232C serial port can be either a positive voltage or a negative voltage (typically in a range of from 8 to 15 volts).

The software operating within the computer sets within the microcontroller IC1 sets its serial port signal RTS to the positive voltage. Current thus flows through resistor R3, forward biased diode D1, and reverse biased zener diode Z1 to ground. This circuit acts as a 5 volt zener regulator with resistor R3 limiting the current and Z1 providing a voltage reference. Positive 5 volts is available at the anode of zener diode Z1 and this is connected to resistor R5 (bias voltage), while microcontroller IC1 (power supply) is connected through resistor R6 (pull up IC1 negative reset) to IC2 (power supply) to IC2 (voltage reference), and to potentiometers P1, P2, P3, and P4 (voltage reference). Before the computer PC1 sets RTS to its positive output it could be outputting its negative voltage. Diode D1 is in the circuit to protect microcontroller IC1 and analog to digital converter IC2 from such negative voltage.

The software present running in the computer which does not form a part of the present invention and only provides the functions described herein, sets the serial port signal TD and resistor R1 to the negative voltage. If transistor Q2 is in the "off" state, resistor R1, and therefore RD, is also at the negative voltage (minus a small drop across resistor R1). If transistor Q2 is turned "on", the positive voltage from RTS present at the emitter of Q2 is also present at the collector of transistor Q2, which will pull resistor R1 and RD up to the positive voltage (minus a small drop across transistor Q2). Q2 therefore acts as a switch which can control the bipolar output on signal lead RD. Transistor Q2 is turned "on" and "off" by transistor Q1 and microcontroller IC1 as follows:

When microcontroller IC1 is in the "high" (positive 5 volts) condition, current will flow from positive 5 volts through resistor R5 into the base of transistor Q1 to microcontroller IC1. This turns "off" transistor Q1. With transistor Q1 "off", there is no current flowing through resistor R4 into transistor Q2 base, therefore transistor Q2 is also "off" which causes RD to be at the negative voltage from terminal TD.

When microcontroller IC1 output G2 is in its "low" (or ground) condition, current will flow from positive 5 volts through resistor R5 into the base of transistor Q1, out of the emitter of transistor Q1 to microcontroller IC1. This will then forward bias the emitter base junction of transistor Q1 which will turn "on" transistor Q1. With transistor Q1 "on" there is a path for current to flow from the positive voltage present at transistor Q2 emitter (from RTS), out of transistor 2Q base. This flows then through resistor R4 into the collector of transistor Q1, out of the emitter of transistor Q1 to integrated circuit IC1 (ground). This will then forward bias the emitter base junction of transistor Q2 which will turn "on" transistor Q2. If transistor Q2 is turned "on", the positive voltage from RTS present at the emitter of transistor Q2 is also present at the collector of transistor Q2 which will then pull resistor R1 and lead RD up to the positive voltage (minus a small drop across transistor Q2).

While but a single embodiment of the present invention has been shown it will be obvious to those skilled in the art that numerous modifications may be made without departing from the spirit of the present invention which shall be limited only by the scope of the claims appended hereto.

What is claimed is:

1. An interface circuit for use between a control point including at least one joystick and at least one switch, said interface connected between said control point and a computer of the type having a serial bipolar data input, said interface comprising:
- a microcontroller including a plurality of input circuits and an output circuit;
- an analog to digital converter including at least one input circuit connected directly to at least one joystick and a plurality of output circuits connected to a portion of the input circuits of said microcontroller;
- at least one switch including a circuit connection directly to said microcontroller;
- and a pulse converter connected between the output of said microcontroller and said computer input whereby digital signals representative of a switch closure or for representations of analog positions of said joystick are converted to digital signals by said analog to digital converter and said converted signals input to said microcontroller are reformatted in serial digital form for application to said pulse converter, said pulse converter converting said serial digital signals to bipolar values appropiate for transmission to said computer.

2. An interface circuit as claimed in claim 1 wherein: said pulse converter comprises a two stage transistorized circuit connected between said microcontroller and said computer.

3. An interface circuit as claimed in claim 2 wherein: said two stage transistorized pulse converter comprises a first NPN transistor having an emitter electrode connected to the output of said microcontroller and a collector electrode connected to a PNP transistor base electrode; said PNP transistor further including a collector electrode and emitter electrode each connected to said computer.

4. An interface circuit as claimed in claim 1 wherein: there is further included a power supply providing the necessary power for at least one switch, at least one joystick, said analog to digital converter, said microcontroller, and said pulse converter.

5. An interface circuit as claimed in claim 1 wherein: said analog to digital converter comprises an integrated circuit.

6. An interface circuit as claimed in claim 1 wherein: said microcontroller includes a universal asynchronous receive and transmit facility for use in outputting signals reformatted by said microcontroller.

7. An interface circuit as claimed in claim 1 wherein: said control point is equipped to transmit analog signal outputs directly to said microcontroller.

8. An interface circuit as claimed in claim 1 wherein: there is further included a timer circuit connected to said microcontroller to determine the value of data transmitted from said control point to said microcontroller.

9. An interface circuit as claimed in claim 1 wherein: said computer serial bipolar data input is of the electronic industry standard referred to as an RS232 input.

10. An interface circuit as claimed in claim 1 wherein: said control point transmits data to said microcontroller in a coded bit stream employing pulse code modulations or in the alternative employing pulse position modulation.

* * * * *